United States Patent [19]
Guerra

[11] 3,983,951
[45] Oct. 5, 1976

[54] FRONT END DRIVE MOUNTING

[76] Inventor: Imeldo Rodriguez Guerra, Sierra de Queixa 34 B.D., San Francisco, Orense, Spain

[22] Filed: Oct. 22, 1975

[21] Appl. No.: 624,939

[52] U.S. Cl. ............................................... 180/43 A
[51] Int. Cl.² ............................................. B60K 17/30
[58] Field of Search ................ 180/43 A, 43 R, 45, 180/44 R, 1 AW, 1 A, 1 AS, 1 B; 74/417, 424; 280/95 R

[56] References Cited
UNITED STATES PATENTS

| | | | |
|---|---|---|---|
| 783,719 | 2/1905 | Campbell | 180/43 R |
| 1,167,424 | 12/1916 | Noel | 180/43 A |
| 1,241,118 | 9/1917 | Hoskins | 180/43 R |
| 1,248,224 | 11/1917 | Weinrich | 180/43 A |
| 1,324,062 | 12/1919 | Noel | 180/43 A |
| 1,974,036 | 9/1934 | Ammen | 280/95 R |
| 2,863,518 | 12/1958 | Pellizzetti | 280/95 R |
| 3,283,842 | 11/1966 | Watt | 180/43 R |

FOREIGN PATENTS OR APPLICATIONS

| | | | |
|---|---|---|---|
| 451,813 | 8/1936 | United Kingdom | 180/45 |

Primary Examiner—M. H. Wood, Jr.
Assistant Examiner—Jack D. Rubenstein
Attorney, Agent, or Firm—Blair & Brown

[57] ABSTRACT

A mounting for the front wheels of an automobile in which the wheels are driven by spherical gears, and in which the wheels may be turned about a vertical axis to a position at 90° to the normal straight forward position at least toward one side of the automobile.

1 Claim, 5 Drawing Figures

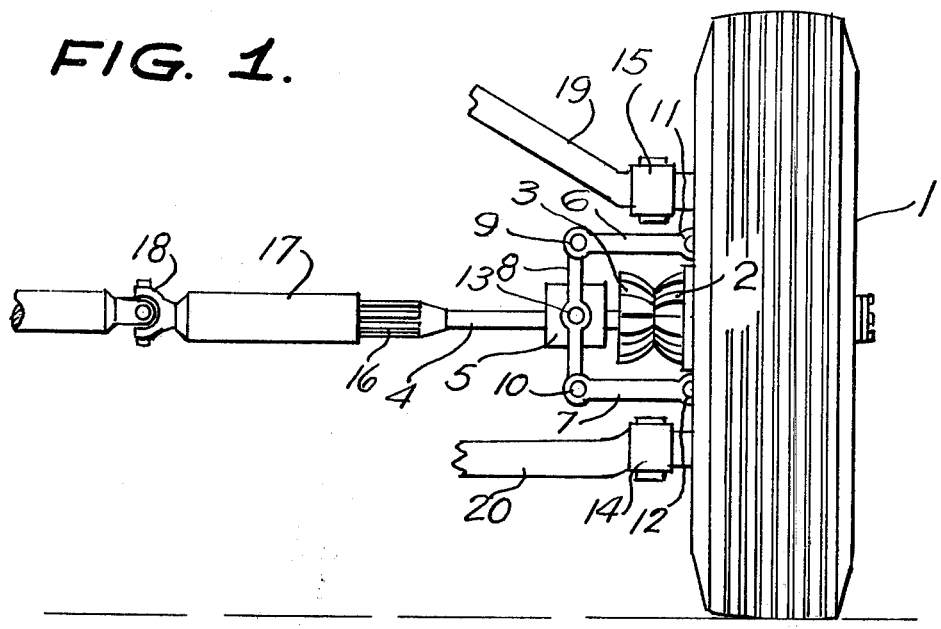
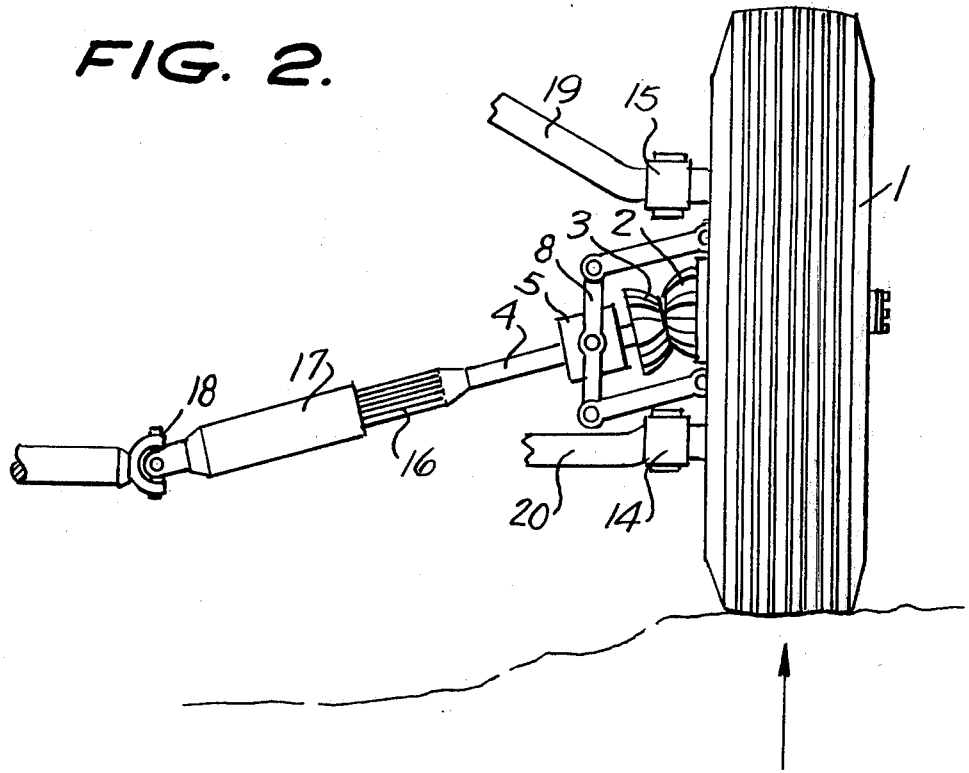

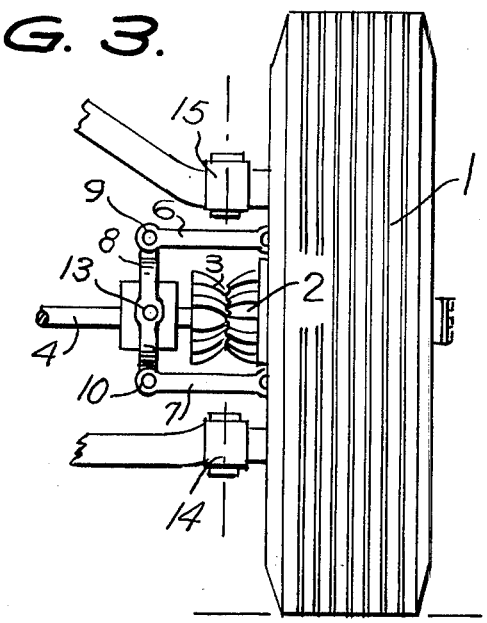
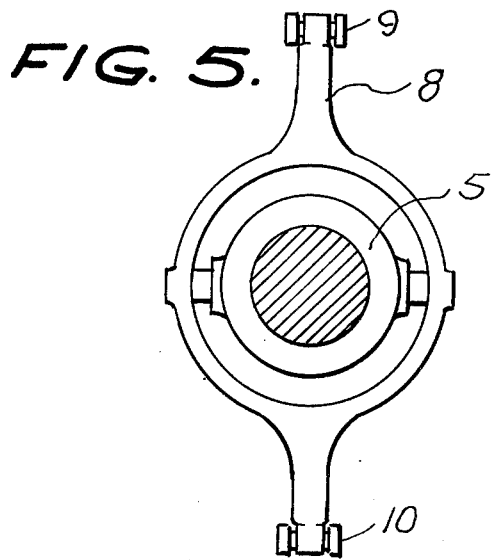
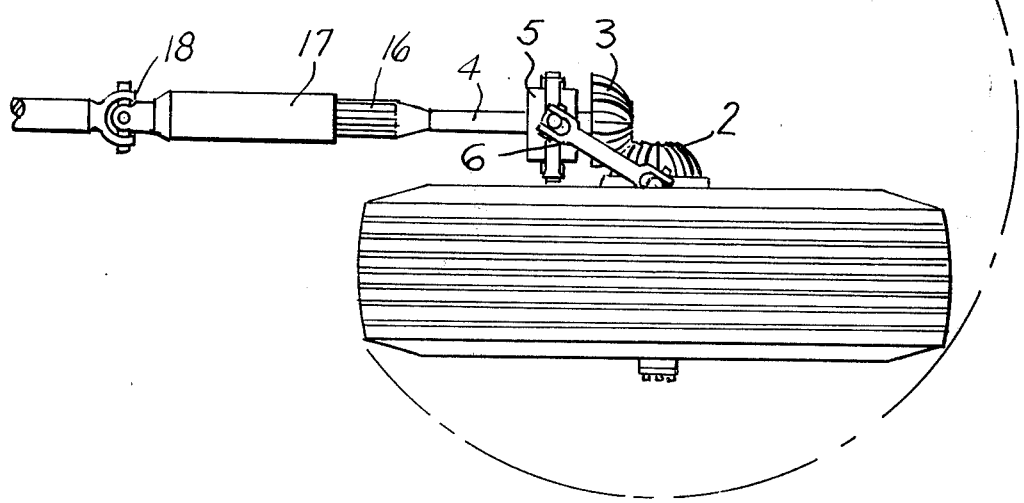

FRONT END DRIVE MOUNTING

BACKGROUND OF THE INVENTION

FIELD OF THE INVENTION

It has been found in congested areas that parking an automobile is difficult, yet often parking spaces that are only a few inches longer than the automobile are available. With a conventional automobile, however, it is impossible to take advantage of such spaces.

It is a purpose, therefore, of the present invention to provide a mounting for driven automobile front wheels so constructed and arranged that, when desired, the wheels may be turned about a vertical axis whereby when the wheels are at ninety degrees to the normal direction of movement of the vehicle, the vehicle may be moved sideways under power into a parking space very little longer than the vehicle itself.

It is also noted that in automobiles it is desirable to have the weight of as much of the vehicle as possible supported by springs in order to provide for the comfort of the passengers, and to support as much as possible of the moving parts of the driving machinery by springs so as not to be subject to vibrations and jolting when passing over rough roads at high speeds.

It is therefore an object of the present invention to provide apparatus to support the driving wheels of an automobile by a mounting such that the wheel may move vertically with respect to the vehicle body, yet be driven from a differential that is fixed for movement with the vehicle body.

Other objects and advantages will become apparent in the following specifications when considered in light of the attached drawings.

BRIEF DESCRIPTIN OF THE DRAWINGS

FIG. 1 is a view of the invention from the front of the automobile, showing only the essential parts of the invention, when the wheel is running on a flat road;

FIG. 2 is a view simiar to FIG. 1 in which the wheel is passing over a bump in the road and is elevated against the conventional spring (not shown);

FIGS. 3 and 4 illustrate the concentricity of the vertical axis of the kingpin about which the wheel turns in steering from the position for straight ahead driving in FIG. 3, to the driving at a 90° angle to straight ahead shown in FIG. 4; and FIG. 5 shows the yoke carrying the drive shaft extending from the differential to the spherical gear at the kingpin.

DESCRIPTION OF THE PREFERRED EMBODIMENT

In FIG. 1 a wheel 1 is driven by a spherical driving gear 2 meshing with a second driving spherical gear 3 mounted on drive shaft or axle 4 which is supported in a journal 5. Journal 5 is mounted in a yoke 8 forming a vertical link of a four bar link 6, 7, 8 and the brake drum or steering knuckle kingpin, wheel supporting element supported by the conventional spring mounting control arms 19 and 20. The four links of the four bar linkage 6, 7, 8 and the brake support are pivoted to each other at 9, 10, 11 and 12 on horizontal pivots and also on vertical pivots at the same points. Ball and socket joints might be used.

Bushing 5 is mounted in link 8 as seen in FIG. 5 by means of horizontal pivot 13 so that drive shaft 4 may change its angle with respect to the axis of gear 2.

Drive shaft 4 is connected via a splined portion 16 slidably but not rotatably carried in a tubular shaft portion 17, to a universal joint 18 which is mounted on a shaft extending from a differential, not shown. This slidable or extensible shaft is desirable to relieve the possibility of conveying end thrust via the shaft 4 to either universal joint 18 or spherical gears 3, 2.

It will be noted from FIGS. 1 and 2 that the four bar linkage 6, 7, 8 and the kingpin will hold gears 2 and 3 in mesh as the wheel 1 moves up and down as it rolls over bumps in the road.

Similarly the linkage 6, 7 pivoting on pivots 9, 10, 11 and 12 will hold spherical gears 2 and 3 in mesh as the wheel is turned from its normal driving position of FIG. 3 to its position in FIG. 4 turned to 90° from the normal driving position.

Having thus described the preferred embodiment of the invention it should be understood that numerous structural modifications and adaptations may be resorted to without departing from the spirit of the invention.

What is claimed is:
1. In a front wheel drive automobile of the type where the front wheels are supported on control arms and in which the front wheels are driven by driving and driven spherical gears, a four bar linkage to support the driving gear with respect to the driven spherical gear, each link of said four bar linkage being connected to each adjacent link for both horizontal and vertical pivoting at each end of each link, the pivots at each end of the link in which the driven spherical gear is mounted being held in vertical position, the driving shaft of said driving spherical gear being mounted in a bushing supported by the link of said four bar link opposite said driven gear, the axes of said driving and driven gears passing through the vertical axis about which the front wheel turns in steering the automobile.

* * * * *